Feb. 28, 1950  J. J. RILEY  2,499,281
FLASH BUTT WELDING APPARATUS
Filed Sept. 13, 1946
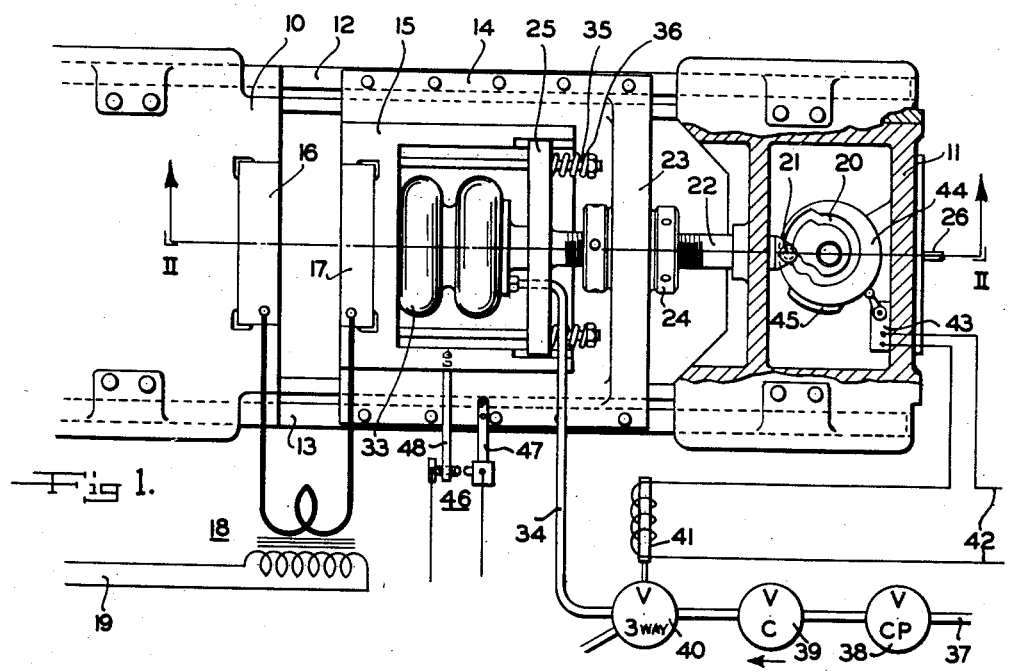
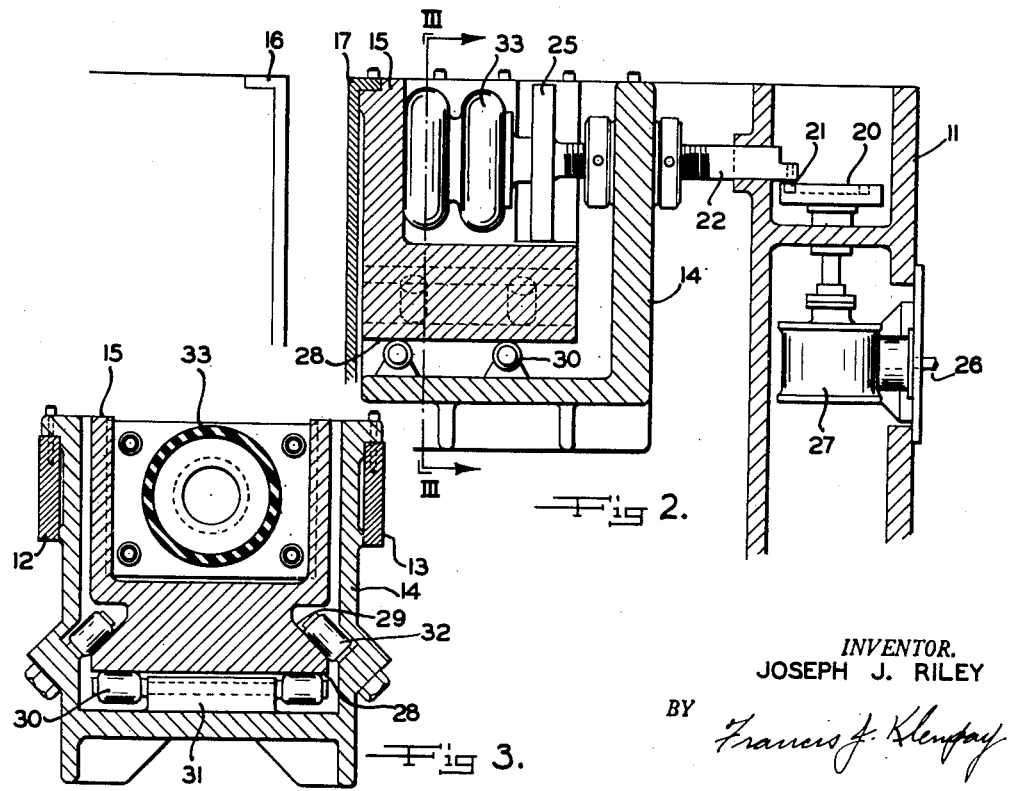
INVENTOR.
JOSEPH J. RILEY
BY Francis J. Klempay
ATTORNEY.

Patented Feb. 28, 1950

2,499,281

UNITED STATES PATENT OFFICE 2,499,281

FLASH BUTT WELDING APPARATUS

Joseph J. Riley, Warren, Ohio, assignor to The Taylor-Winfield Corporation, Warren, Ohio, a corporation of Ohio Application September 13, 1946, Serial No. 696,659

5 Claims. (Cl. 219—4)

This invention relates to the general art of electric resistance welding and more particularly to electric resistance welding of the flash-butt type. In this process the pieces to be welded together are connected through suitable current-conductive clamps, platens, etc., to the opposite terminals of a suitable welding current source as the secondary winding of a welding transformer and the pieces are brought together to initiate arcing or flashing between the cleft to progressively heat the contiguous edges of the stock pieces after which the stock pieces are forced together to effect the weld. Difficulties arise in the application of this process to metals having a narrow range of plasticity such as aluminum, brass, alloys rich in nickel, etc., since if at the moment of forcing the work pieces together the temperature of the end portions to be joined is only slightly too high the end portions will be excessively bent and distorted whereas if the temperature is only slightly too low sound and consistent welds will not be obtained. Various attempts have heretofore been made to so precisely control the quantity of heat imparted by the flashing current that bending and distortion of the work pieces at time of upset is brought within allowable limits when the welding is accomplished on conventional machines having positive acting mechanical or hydraulic mechanisms for effecting the upsetting movement.

I have found that consistently good results in the flash-butt welding of metals having a low range of plasticity may be accomplished in a more practical manner by controlling more precisely the force applied to the work pieces during the upset period. By accurately controlling this force the same may be scaled down in predetermined relation to the nature of the particular work at hand so that during this controlled manipulation the temperature attained in the work pieces is not so critical to the final result, providing the temperature is at or above a minimum safe welding temperature. It is accordingly a primary object of the invention to provide an improved flash-butt welding process which may be employed, in a practical manner for the welding of metals having a low range of plasticity and without the use of complicated or costly systems for controlling the welding current applied to the work pieces.

Another object of the invention is the provision of improved flash-butt welding apparatus wherein the force exerted on the work pieces during the upsetting period of the welding cycle may be more precisely controlled than in any machine heretofore proposed for flash-butt welding operations.

A further and more specific object of the invention is the provision of an improved flash-butt welding machine in which the welding force applied to the work pieces during the upset period of the welding cycle remains substantially uniform throughout the entire extent of the "hold" time.

A still further object of the invention is the provision of an improved flash-butt welding machine wherein the work pieces to be welded together are, at the conclusion of the flashing period, brought together and held together in a firm but smooth manner free of chatter and excessive force applications whereby improved welds of consistent quality may be effected.

The above and other objects and advantages of the invention will become apparent upon consideration of the following detailed specification and the accompanying drawing wherein there is disclosed a preferred embodiment of the invention.

In the drawing:

Figure 1 is a plan view of an electric resistance flash-butt welding machine constructed in accordance with the principles of the invention;

Figure 2 is a fragmentary longitudinal section taken along the line II—II of Figure 1; and Figure 3 is a transverse section taken along the line III—III of Figure 2.

The machine illustrated is, in accordance with usual practice, provided with a rigid base or frame and forming part of this rigid assembly is a fixed platen 10 and a head structure 11. Slideably mounted in the fixed assembly in the manner more fully described in the co-pending application of M. M. Seeloff Serial No. 598,096, filed June 7, 1945 for Flash welder construction, now Patent No. 2,430,787, dated November 11, 1947, is a pair of spaced parallel longitudinally movable side rails 12 and 13. Spanning the center portions of the rails 12 and 13 and rigidly connected thereto is a frame member 14 which carries a platen member 15 which is preferably anti-frictionally mounted for longitudinal movement in the frame member 14.

Platen 10 is provided with a plate 16 made of metal having good current conducting characteristics and a similar plate 17 is mounted on the movable platen 15. In accordance with usual practice the plates 16 and 17 are connected to opposite terminals of the secondary of a welding transformer 18 and the energizing circuit 19 for the primary winding of the welding transformer may be controlled in any suitable manner. It should also be understood that the platens 10 and 15 carry the fixtures and clamps, not shown, for holding the work pieces during the welding thereof and that suitable means is provided to conduct the welding current from the plates 16 and 17 to the work pieces through the fixtures and clamps.

The carrier 14 is arranged to be moved longitudinally by a cam 20 having a follower 21 which is carried by the outer end of a rod 22 having adjustable interconnection with the rear web or wall 23 of the carrier 14 by means of threads on the rod and the lock nuts 24 which engage opposite sides of the web 23. The extreme end of the rod 22 opposite the cam follower 21 is formed with a transversely extending plate 25 which is longitudinally slideable in suitable recesses formed in the platen 15. Cam 20 is arranged to be rotated from any suitable power source through shaft 26 and reduction gear 27.

Referring now to Figures 2 and 3 the lower portion of the platen 15 is formed with a flat bottom surface 28 and inwardly inclined side surfaces 29. Platen 15 is movably supported on a plurality of longitudinally and laterally spaced rollers 30 which are rotatably carried by suitable supports 31 resting on the bottom web of the carrier 14. Platen 15 is guided by the antifrictionally mounted rollers 32, two of which engage each of the surfaces 29 and, as shown, these rollers 32 may be carried on stub shafts which are rigidly carried by the side walls or struts of the member 14. Rollers 32 have line contact with the surfaces 29 and the rollers 30 have line contact with the surfaces 28 and it should be apparent that by reason of the angular relation of the surfaces 28 and 29 the platen 15 will be effectively guided for anti-frictional movement in a longitudinal direction.

Interposed between the plate 25 and the front wall of the platen 15 is a bellows assembly 33 shown as consisting of a pair of interconnected and axially expansible cells formed of rubber or other suitable flexible material. A conduit 34 is provided to conduct fluid (preferably air) into the bellows 33 and it will be observed that upon appreciable pressure being built up in the bellows the bellows will expand to move the platen 15 relative to the carrier 14. A plurality of guide rods 35 are rigidly carried by the platen 15 and are slideably received in apertures formed in the plate 25. Encircling the outer ends of the rods 35 are springs 36 which function to retract the platen 15 when no pressure is applied to the bellows 33. The depth of the recess which receives the plate 25 in the platen 15 determines the retracted position of the platen relative to the member 14 and the platen remains in this retracted position during "flashing" movement of the member 14 by the cam 20. It will be understood that the shape of the cam 20 will provide the necessary rate and character of movement of the movable platen 15 during the flashing period. The distance between the work holding dies or fixtures at the end of the flashing period may, of course, be controlled by adjustment of the nuts 24 and cam 20 is so contoured that at the end of the flashing period a "flat" portion is reached to subsequently hold the carrier 14 in fixed position.

For controlling the flow of fluid pressure into the bellows 33 I may provide a conduit 37 leading from any suitable fluid pressure source as an accumulator for example, and interposed between conduit 37 and conduit 34 is an automatic pressure controlling valve 38, a check valve 39, and a solenoid operated three-way valve 40 which is operative upon energization to connect the source of fluid pressure with conduit 34 but which upon deenergization exhausts the conduit 34 while the source of fluid pressure is sealed off. Thus, the valve 40 is provided with an operating solenoid 41 and, as shown, solenoid 41 may be energized from a suitable circuit 42 under the control of a switch 43 arranged for actuation by a cam 44 which is preferably mounted on the same shaft as the cam 20. The parts are so designed that the switch 43 is closed at the time or at a predetermined interval after the cam 20 reaches its "flat" portion whereby fluid pressure is admitted to the bellows 33 to start the upsetting movement of the platen 15 relative to the carrier 14 immediately upon termination of the flashing period or at a predetermined time thereafter. Thus the raised or switch actuating portion 45 of the cam 44 may be made circumferentially adjustable if desired. Inasmuch as the force exerting characteristic of the bellows 33 is substantially uniform throughout the relatively small range of expansion required for effecting the upset in the work pieces the force exerted during the entire extent of the upsetting movement of the platen 15 may be accurately controlled as will be understood and this operating characteristic is of distinct advantage in welding light sections or in welding metals having a narrow range of plasticity. Moreover, the value of this force may readily be varied by changing the adjustment of the pressure regulating valve 38, it being understood that such valves are normally provided with means for changing the pressure of the fluid delivered.

In certain flash-butt welding operations it is desirable to apply welding current during the upsetting operation and to maintain this current until a predetermined degree of upset has been accomplished. In accordance with this invention this mode of operation may be readily accomplished by providing a welding current cut-off switch 46 arranged to be opened following a predetermined extent of upset and in the apparatus illustrated this will be determined by the extent of relative movement between the members 14 and 15. Thus, one of the contacts for switch 46 may be carried on an arm 47 extending outwardly from the member 14 while the opposite switch contact is carried by an arm 48 extending outwardly from the platen 15.

It should now be apparent that I have provided an improved flash-butt welding method and an improved welding apparatus capable of carrying out the method which accomplish the objects initially set out. The method and apparatus provides for the precise and uniform control over the welding force exerted during the upset period and this operating characteristic enables uniform and consistent welds to be effected with a lesser degree of control over the heating and plasticity condition of the work pieces than has heretofore been considered necessary. Further, since the only part of the apparatus which moves during the upset period is the platen 15 and since in practice this platen will be made as light as possible there is a substantial reduction in apparatus inertia as regards relative movement of the work pieces during upset thus enabling the work to respond most precisely to the timed force exerted by the bellows. Also of advantage in this regard is the anti-frictional mounting of the platen and the manner in which it is guided for longitudinal movement. The rate of upset may be most expeditiously controlled by simply inserting a metering valve in the fluid supply conduit as will be understood.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. In electric resistance flash-butt welding apparatus the combination of a fixed platen, a carrier slideably mounted for movement toward and away from said fixed platen, a movable platen slideably mounted on said carrier for movement toward and away from said fixed platen, means to move said carrier to effect relative movement of said platens during the flashing period of a welding cycle, and means on said carrier to move said movable platen relative to said carrier to effect relative movement of said platens during the upsetting period of said welding cycle.

2. Apparatus according to claim 1 further characterized in that said means on said carrier to move said movable platen comprises a fluid pressure operated bellows, a source of fluid pressure, and means to connect said source with said bellows after the termination of said flashing period.

3. Apparatus according to claim 1 further characterized in that said means to move said carrier comprises a motor driven cam and in that said means on said carrier to move said movable platen comprises a fluid pressure operated expansible bellows, a source of fluid pressure, and means associated with said cam to connect said source with said bellows upon said carrier reaching a predetermined advanced position.

4. In electric resistance flash-butt welding apparatus the combination of a normally fixed platen, a carrier slideably mounted for movement toward and away from said normally fixed platen, a movable platen slideably mounted in said carrier for movement toward and away from said normally fixed platen, anti-friction means comprising angularly disposed rollers for movably supporting and guiding said movable platen in said carrier, means to move said carrier toward and away from said normally fixed platen, and means on said carrier to move said movable platen relative to said carrier, said means on said carrier to move said movable platen comprising a fluid pressure operated expansible bellows, a source of fluid pressure, and control means to interconnect said source and said bellows.

5. Apparatus according to claim 1 further including a welding current cut-off switch arranged to be actuated upon said movable platen being moved a predetermined interval relative to said carrier by said means on said carrier.

JOSEPH J. RILEY.

REFERENCES CITED

The following references are of record in the file of this patent:

UNITED STATES PATENTS

| Number | Name | Date |
| --- | --- | --- |
| 1,228,843 | Spire | June 5, 1917 |
| 1,984,988 | Raupach et al. | Dec. 18, 1934 |